(12) United States Patent
Cheng et al.

(10) Patent No.: US 10,788,113 B2
(45) Date of Patent: Sep. 29, 2020

(54) MECHANICAL LOCKING DIFFERENTIAL

(71) Applicant: Zhejiang CFMOTO Power Co., Ltd., Hangzhou, Zhejiang (CN)

(72) Inventors: Fuying Cheng, Hangzhou (CN); Zhenxiang Kuang, Hangzhou (CN)

(73) Assignee: Zhejiang CFMOTO Power Co., Ltd., Hangzhou (CN)

( * ) Notice: Subject to any disclaimer, the term of this patent is extended or adjusted under 35 U.S.C. 154(b) by 644 days.

(21) Appl. No.: 15/617,414

(22) Filed: Jun. 8, 2017

(65) Prior Publication Data

US 2017/0356538 A1   Dec. 14, 2017

Related U.S. Application Data

(63) Continuation-in-part of application No. 15/288,215, filed on Oct. 7, 2016, now Pat. No. 9,890,843.

(30) Foreign Application Priority Data

Jun. 8, 2016 (CN) ............... 2016 2 0555593 U

(51) Int. Cl.
*F16H 48/12* (2012.01)
*F16H 48/24* (2006.01)
*F16H 48/40* (2012.01)

(52) U.S. Cl.
CPC ............ *F16H 48/12* (2013.01); *F16H 48/24* (2013.01); *F16H 48/40* (2013.01)

(58) Field of Classification Search
CPC .......... F16H 48/12; F16H 48/14; F16H 48/24; F16H 48/40

USPC .......................................................... 74/650
See application file for complete search history.

(56) References Cited

U.S. PATENT DOCUMENTS

| | | | |
|---|---|---|---|
| 4,437,530 A | 3/1984 | De Young et al. | |
| 4,524,640 A * | 6/1985 | Neumann | F16H 48/142 192/50 |
| 4,557,158 A * | 12/1985 | Dissett | F16H 48/12 74/650 |
| 4,644,818 A * | 2/1987 | Choma | F16H 48/142 74/650 |
| 4,727,769 A * | 3/1988 | Wu | B60K 23/0808 180/249 |
| 4,745,818 A * | 5/1988 | Edwards | F16H 48/142 74/650 |
| 5,419,406 A | 5/1995 | Kawamoto et al. | |
| 5,443,130 A | 8/1995 | Tanaka et al. | |

(Continued)

FOREIGN PATENT DOCUMENTS

CN   200978937 Y   11/2007
CN   101871529 A   10/2010

*Primary Examiner* — Ha Dinh Ho
(74) *Attorney, Agent, or Firm* — Schewchuk IP Services, LLC; Jeffrey D. Shewchuk

(57) ABSTRACT

A mechanical locking differential primarily includes a drive ring and right and left driven rings that can move sideways into and out of engagement with the drive ring. The drive ring and the driven rings have teeth with an inverted trapezoidal shape with a significant clearance, such as a pressure angle of −1° and a clearance of 20% circumferentially. A central ramping separator ring provides a ramping mechanism with inclines that push the driven rings out of engagement with the drive ring when the associated half axle rotates faster than the drive ring, with the ramping action occurring within the teeth clearance.

18 Claims, 8 Drawing Sheets

(56) References Cited

U.S. PATENT DOCUMENTS

| | | | |
|---|---|---|---|
| 5,590,572 A * | 1/1997 | Valente | F16H 48/24 74/650 |
| 5,919,109 A | 7/1999 | Fleckenstein | |
| 6,092,439 A | 7/2000 | Tyson et al. | |
| 8,640,801 B2 | 2/2014 | Hennings et al. | |
| 9,387,756 B1 | 7/2016 | Whiting et al. | |
| 9,630,488 B2 | 4/2017 | Koenig | |
| 2009/0014223 A1 | 1/2009 | Jones et al. | |
| 2012/0318629 A1 | 12/2012 | Lyman | |
| 2013/0041566 A1 | 2/2013 | Gagnon | |

\* cited by examiner

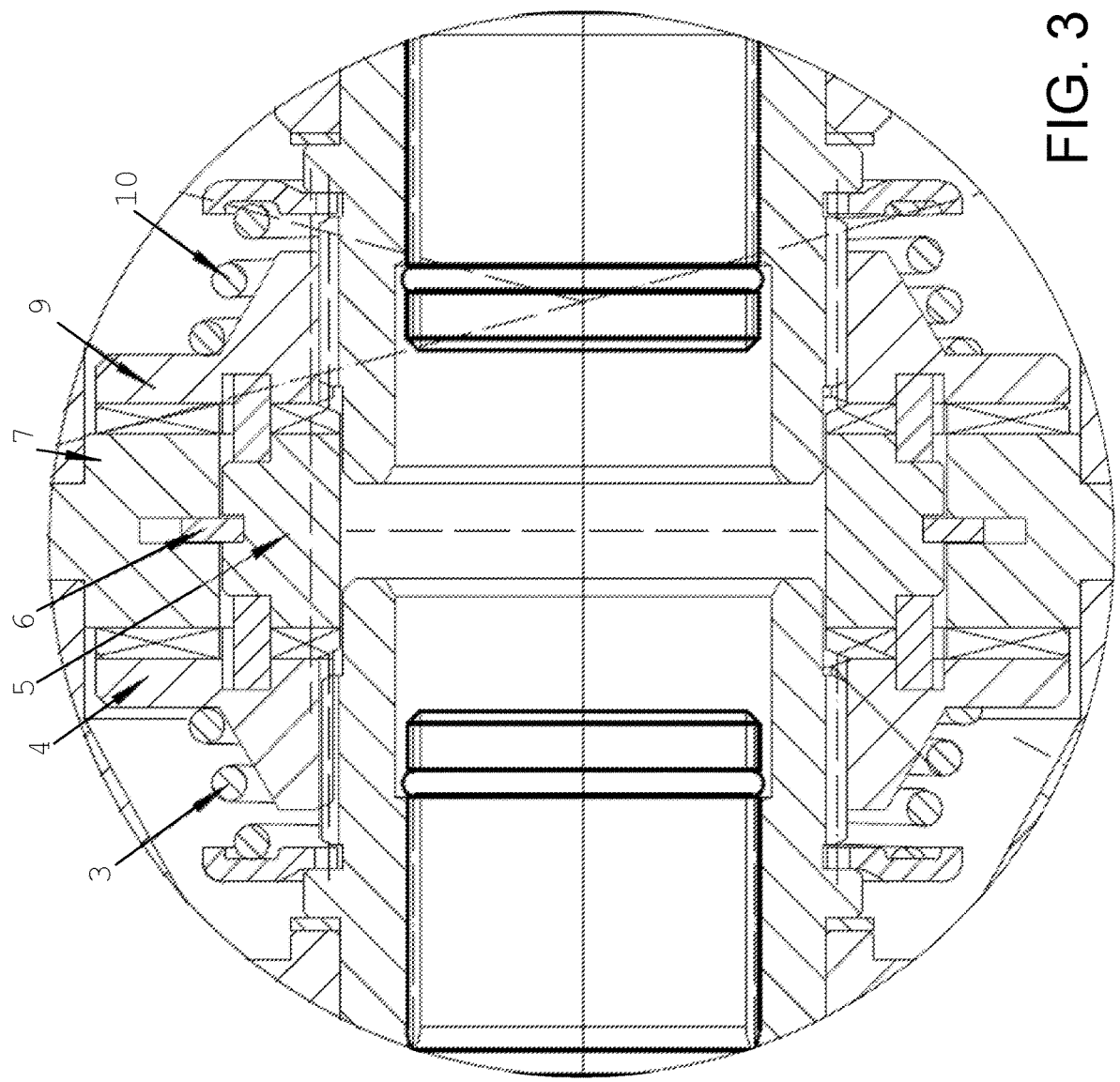

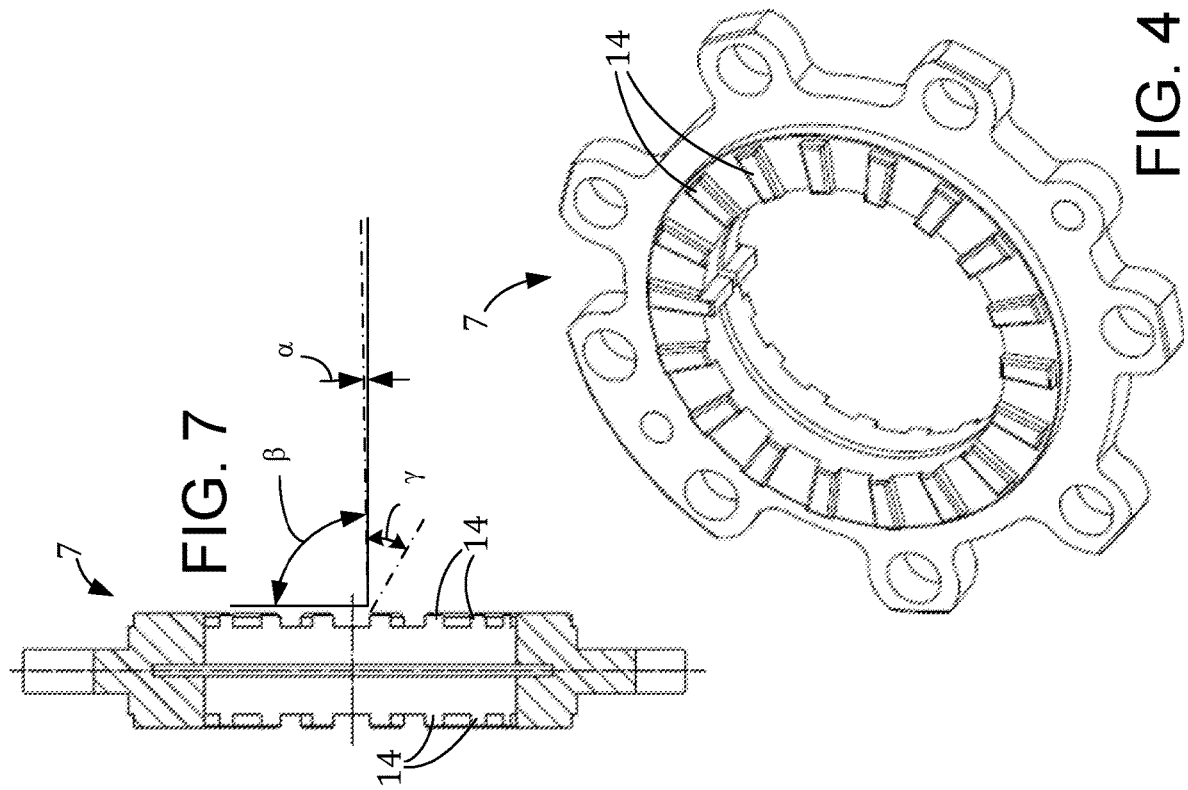
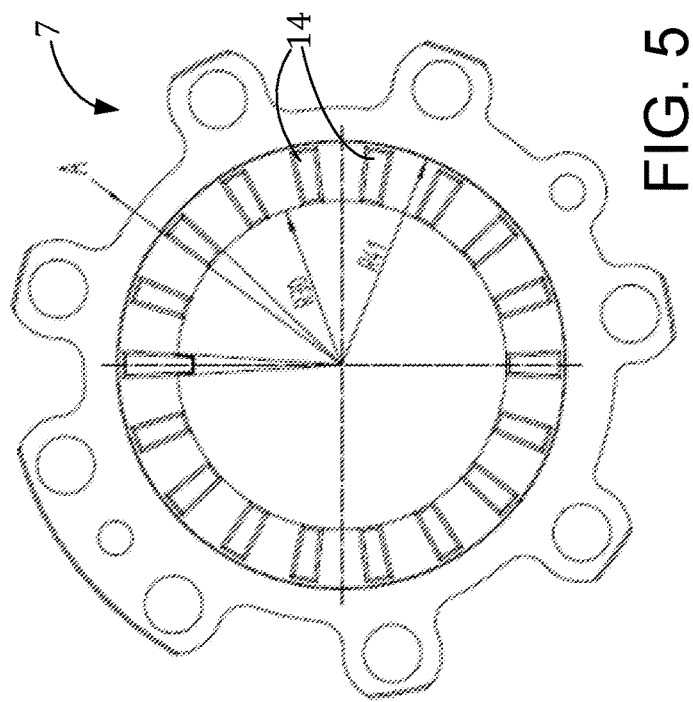
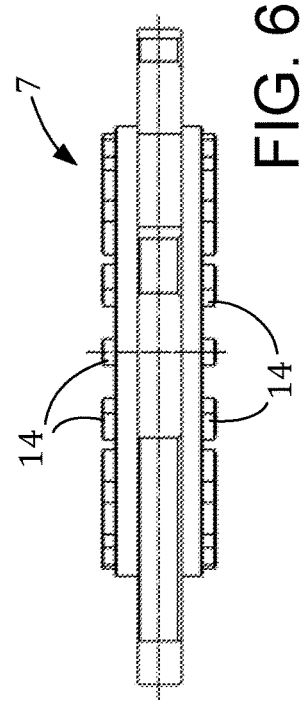

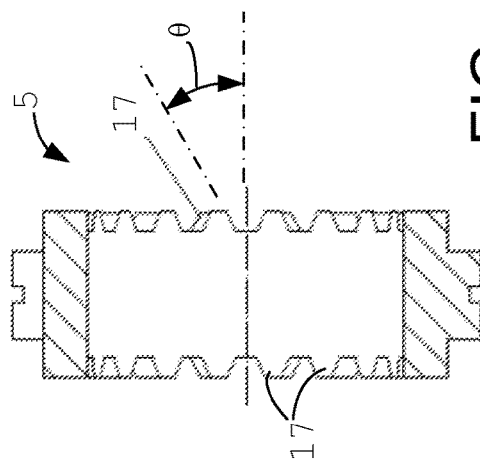
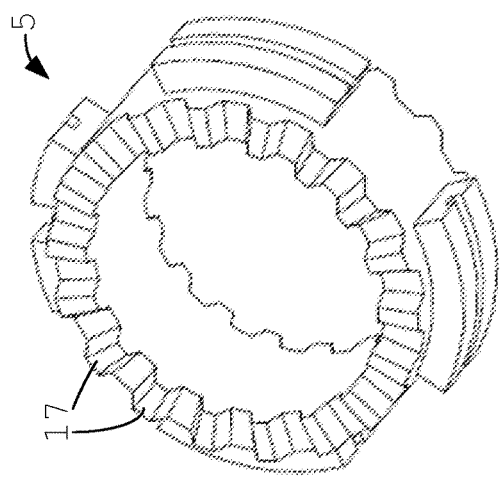
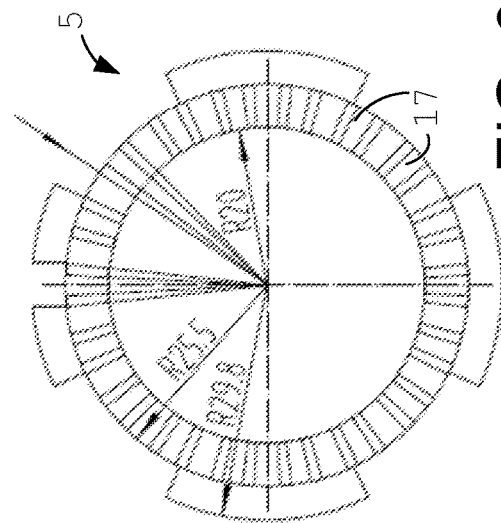
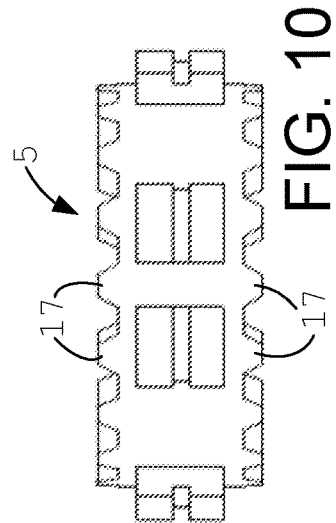

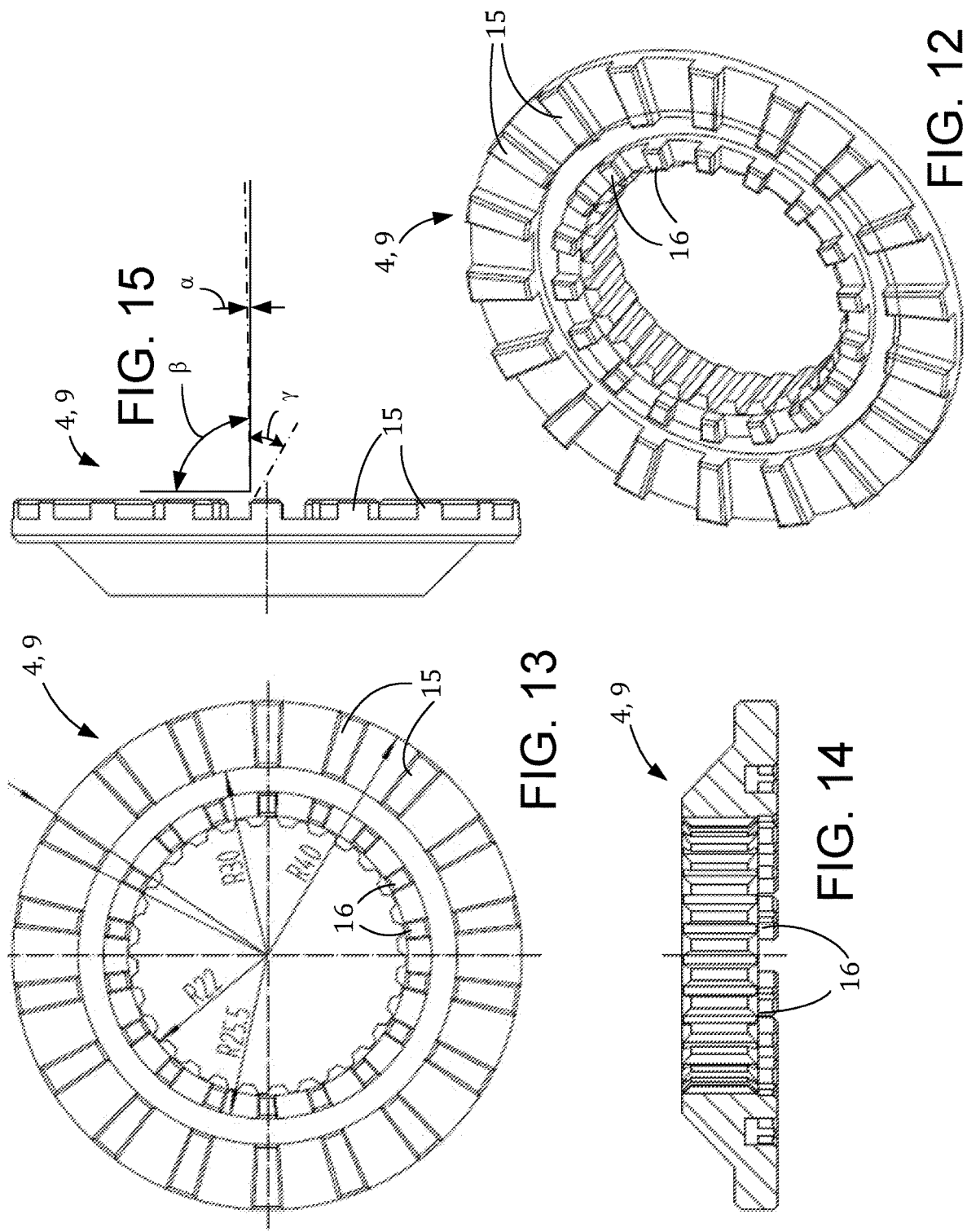

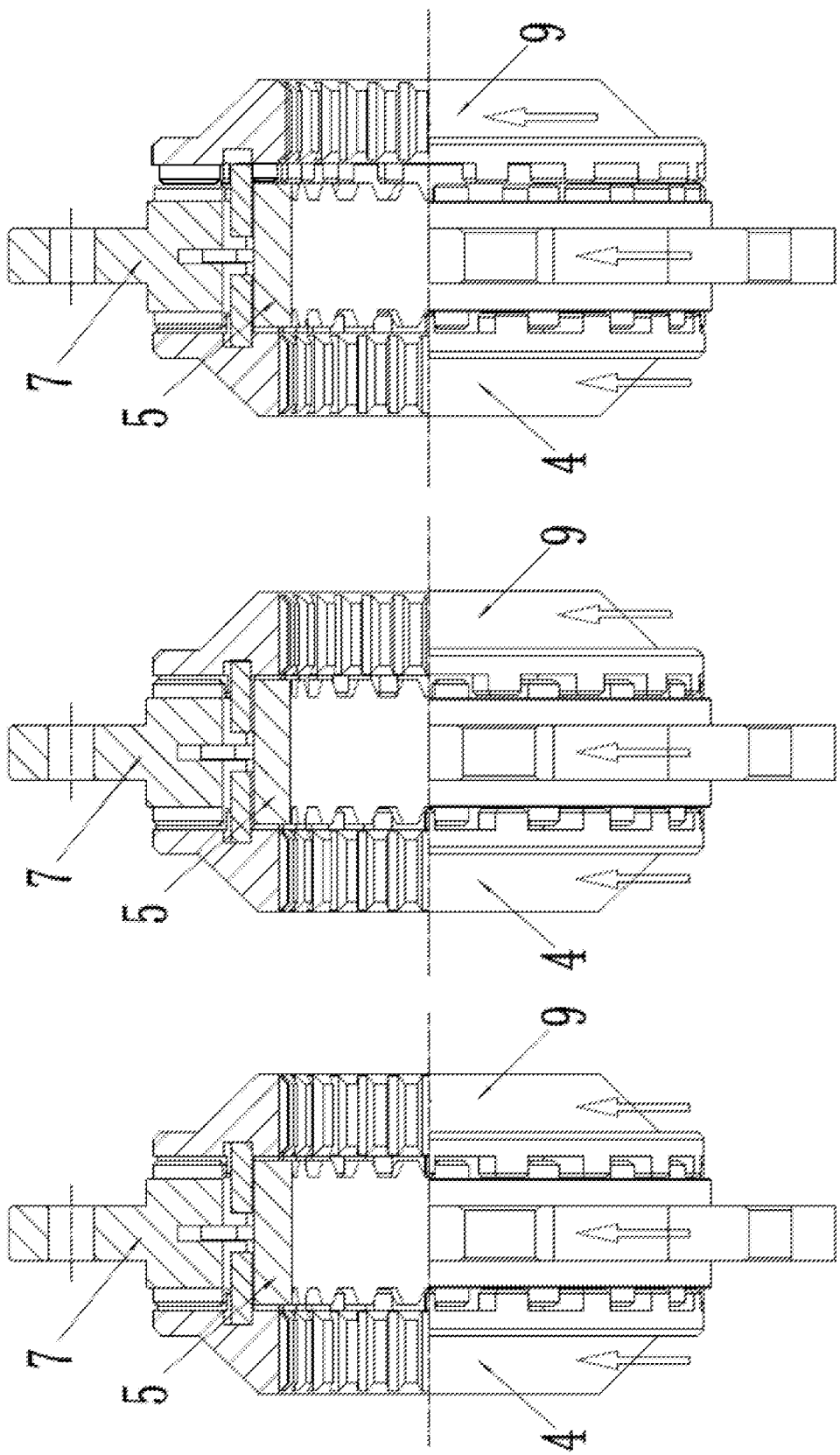

MECHANICAL LOCKING DIFFERENTIAL

CROSS-REFERENCE TO RELATED APPLICATION(S)

The present application is a continuation-in-part of U.S. patent application Ser. No. 15/288,215, filed Oct. 7, 2016 and entitled "ALL-TERRAIN VEHICLE AND TRANSMISSION MECHANISM THEREOF". The present application also claims priority to Chinese Patent Application No. 201620555593.2, titled "ALL-TERRAIN VEHICLE AND TRANSMISSION MECHANISM THEREOF", filed on Jun. 8, 2016, with the Chinese State Intellectual Property Office. The contents of both these applications are hereby incorporated by reference to the maximum extent allowable by law.

FIELD OF THE INVENTION

This application relates to the technical field of vehicles, and particularly to an all-terrain vehicle and a differential mechanism thereof.

BACKGROUND OF THE INVENTION

The term "all-terrain vehicle" refers to a vehicle capable of running on a wide variety of unpaved terrains that ordinary automobiles may have trouble traversing. All-terrain vehicles are commonly known as "ATVs" in the U.S. and China. Many ATVs have a structure similar to a motorcycle which can be straddled, and many components thereof can be used interchangeably with those of a motorcycle. Such ATVs may also be called "quad bikes". ATVs have a variety of uses which are unrestricted by road conditions, and have gained popularity in North America and Western Europe which is increasing year by year.

FIG. 1 shows a prior art axle of a typical ATV including a left half-axle 101 and a right half-axle 102. The axle is not provided with any differential. Thus, the force outputted from the engine to the half-axles is distributed evenly to the half-axles at the two sides, and the left wheel and the right wheel rotate at the same speed.

When the ATV turns a corner, the travel distance of the wheel at the outer side is longer than the travel distance of the wheel at the inner side. When the ATV runs in a straight line on an uneven road, the travel distance of the wheels at the two sides can also be different. In an ATV such as shown in FIG. 1 without a differential, whenever the travel distance of one wheel exceeds the travel distance of the other wheel, some amount wheel slippage occurs between at least one tire and the underlying surface. Even if the road is very flat and straight, wheel slippage can occur due to size errors of tires in manufacturing, different degrees of wear, different loads, or different inflation pressures of the tires. Wheel slippage accelerates tire wear, and reduces the transmission efficiency. In view of this, differentials are designed to allow the half-axles at the two sides to rotate at different speeds, minimizing the amount of wheel slippage in most situations.

However, in many ATV riding situations, one of the wheels can become airborne or loose traction when the other wheel becomes stuck or more difficult to turn. Many differentials can allow one of the wheels to rotate under the driving torque while the other wheel does not. In such situations, the presence of the differential may contribute to the vehicle being stuck.

To address and minimize that problem, differentials have been designed which can be locked or unlocked under the control of the operator, and other differentials have been designed which automatically engage or disengage based on vehicle conditions. However, such occasionally-locking differentials tend to increase the cost of the differential and involve various parts and/or circuits which are complex and subject to breakdown. More simple and less costly designs of differentials, which can lock to minimize the likelihood of the vehicle becoming stuck and unlock when different amounts of wheel travel are called for, are needed.

BRIEF SUMMARY OF THE INVENTION

The present invention is a mechanical locking differential made up primarily of a drive ring and right and left driven rings that can move sideways into and out of engagement with the drive ring. The drive ring has a plurality of drive teeth on each of its two sides mating with teeth of a respective driven ring. The preferred teeth have an inverted trapezoidal shape with a significant clearance. Ramping mechanisms bias the driven rings out of engagement with the drive ring when the associated half axle rotates faster than the drive ring, with the ramping action occurring within the teeth clearance. Tire slipping and scuffing are avoided, while at the same time the differential remains locked even when one wheel is off the ground.

BRIEF DESCRIPTION OF THE DRAWINGS

FIG. 3 is an enlargement of a portion of FIG. 2;

FIG. 4 is a perspective view of the preferred driving ring of FIGS. 2 and 3;

FIG. 5 is a side view of the preferred driving ring of FIGS. 2-4;

FIG. 6 is a top view of the preferred driving ring of FIGS. 2-5;

FIG. 7 is a cross-sectional view of the preferred driving ring of FIGS. 2-6;

FIG. 8 is a perspective view of the preferred central ramping separator ring of FIGS. 2 and 3;

FIG. 9 is a side view of the preferred central ramping separator ring of FIGS. 2, 3 and 8;

FIG. 10 is a top view of the preferred central ramping separator ring of FIGS. 2, 3, 8 and 9;

FIG. 11 is a cross-sectional view of the preferred central ramping separator ring of FIGS. 2, 3 and 8-10;

FIG. 12 is a perspective view of the preferred driven ring of FIGS. 2 and 3;

FIG. 13 is a side view of the preferred driven ring of FIGS. 2, 3 and 12;

FIG. 14 is a cross-sectional view of the preferred driven ring of FIGS. 2, 3, 12 and 13;

FIG. 15 is an end view of the preferred driven ring of FIGS. 2, 3 and 12-14;

FIGS. 16A-C are top plan views, with a portion shown in cross-section, of the assembly of the preferred driving, driven and central ramping separator rings, with FIG. 16A showing engagement of the mechanical locking differential on both sides, FIG. 16B showing the right side beginning to disengage, and FIG. 16C showing the right side fully disengaged.

Figure 1:
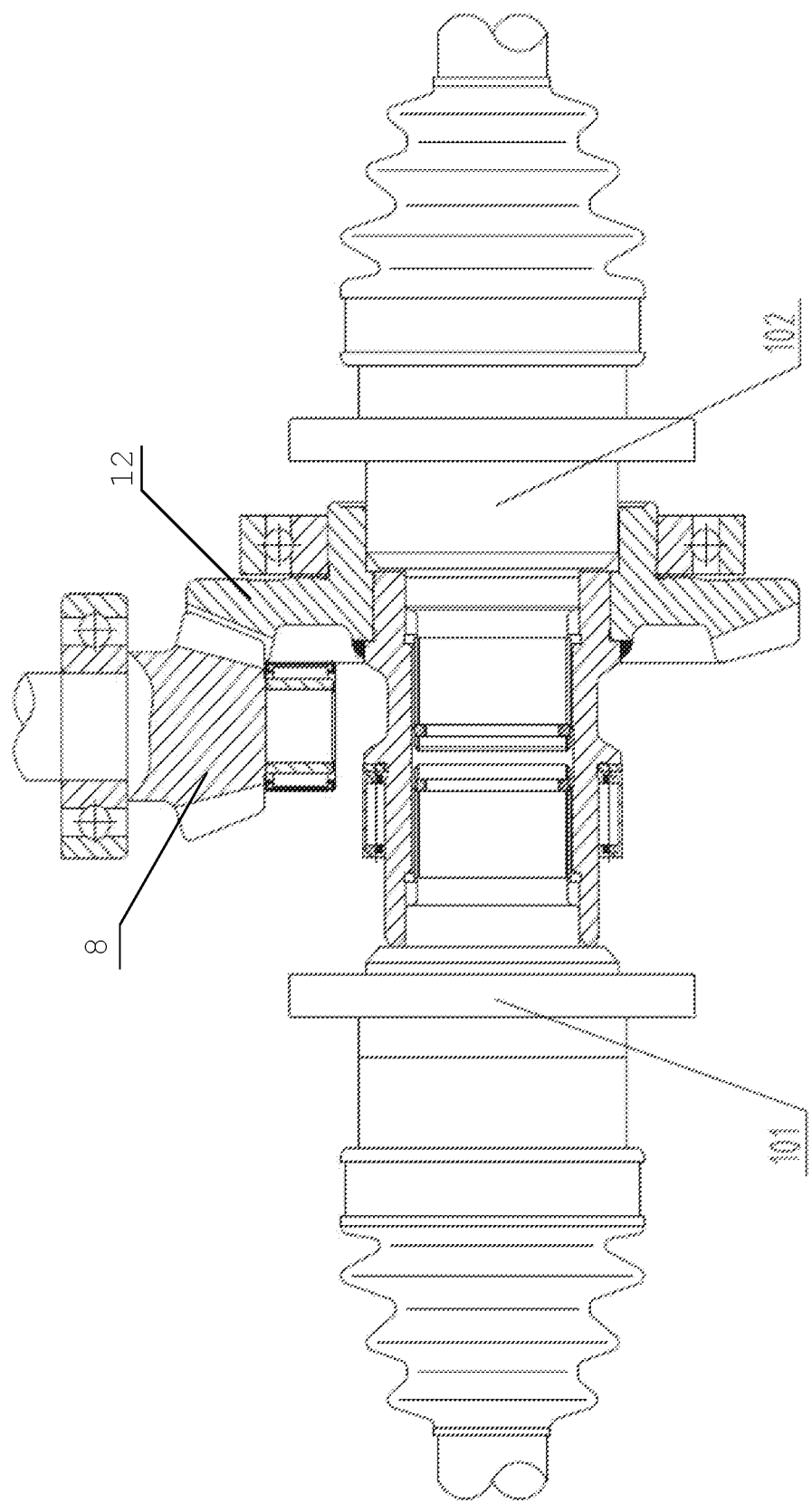
FIG. 1 is a top plan view, with a portion shown in cross-section, showing a prior connection between a drive shaft and the right and left half axles without a differential.

In these Figures, reference numerals are as follows:
1 indicates the left spline sleeve;
2 indicates the differential left shell;
3 indicates the left spring;
4 indicates the left driven ring;
5 indicates the central ramping separator ring;
6 indicates the snap ring;
7 indicates the driving ring;
8 indicates the driving bevel gear;
9 indicates the right driven ring;
10 indicates the right spring;
11 indicates the differential right shell;
12 indicates the driving bevel gear ring;
13 indicates the right spline sleeve;
14 indicates the driving teeth;
15 indicates the driven teeth;
16 indicates the cam teeth;
17 indicates the ramps;
101 indicates the left half axle; and
102 indicates the right half axle.

While the above-identified drawing figures set forth a preferred embodiment, other embodiments of the present invention are also contemplated, some of which are noted in the discussion. In all cases, this disclosure presents the illustrated embodiments of the present invention by way of representation and not limitation. Numerous other minor modifications and embodiments can be devised by those skilled in the art which fall within the scope and spirit of the principles of this invention.

DETAILED DESCRIPTION OF THE PREFERRED EMBODIMENTS

The mechanical locking differential mechanism of the present invention is used in vehicles with right and left driven wheels (not shown) including a left driving half-axle 101 and a right driving half-axle 102. The differential is generally located at a joint of the left driving half-axle 101 and the right driving half-axle 102 where they meet the drive shaft from the vehicle engine (not shown). The drive shaft rotates the driving bevel gear 8 about the drive shaft axis, which in turn rotates the driving bevel gear ring 12 about the axis of the left driving half-axle 101 and the right driving half-axle 102.

The differential includes left and right shell portions 2, 11, which together with a driving ring 7 are bolted to the driving bevel gear ring 12, all rotating together. A central ramping separator ring 5 is nested and connected inside the driving ring 7 by a snap ring 6. The snap ring connection allows the central ramping separator ring 5 to rotate slightly with respect to the driving ring 7, primarily of importance when the vehicle changes from forward to reverse operation, and vice-versa. An alternative embodiment fixes the central ramping separator ring to the driving ring, or forms both the central ramping separator ring and the driving ring as a single integral part.

Figure 2:
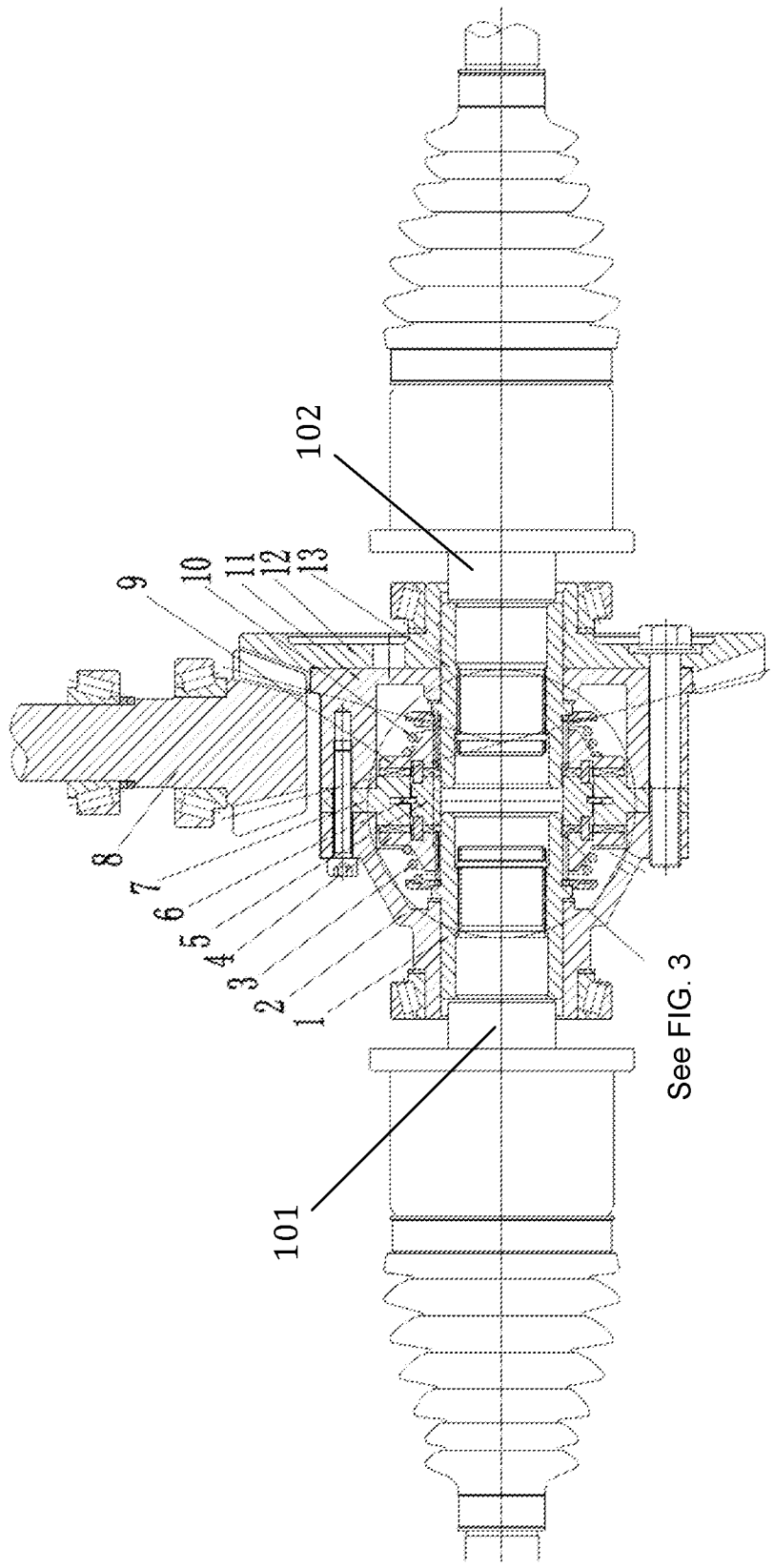
FIG. 2 is a top plan view, with a portion shown in cross-section, of a preferred embodiment of the mechanical locking differential of the present invention.

The locking and unlocking action of the differential is carried out in a simple fashion by transverse movement of two driven rings, a left driven ring 4 and a right driven ring 9. When at the normal inside position shown in FIGS. 2 and 3, each driven ring 4, 9 rotates identically with the driving ring 7 and the differential is locked. Each of the driven rings 4, 9 has splines or a key arrangement 1, 13 at its inside diameter, or is otherwise rotationally fixed to its respective half-axle 101, 102 while still allowing the driven rings 4, 9 to move left or right about the respective half-axle 101, 102. When the two driven rings 4, 9 are at the normal inside position, the left driving half-axle 101 and the right driving half-axle 102 rotate at the same rotational speed as the driven rings 4, 9 and the driving ring 7. However, either driven ring 4, 9 can disengage from the driving ring 7 by sliding transversely on its half-axle 101, 102 away from the driving ring 7. Thus, for instance, the right driven ring 9 can move to its right to the unlocked position shown in FIGS. 16C and 17.

In more particularity, the inside face of each of the driven rings 4, 9 includes a circle of driven teeth 15 that (when in the normal, locked inside position) mesh with drive teeth 14 of the driving ring 7. In the preferred embodiments, the driven rings 4, 9 include eighteen equally spaced driven teeth 15, and the driving ring 7 includes eighteen equally spaced drive teeth 14 per side. The meshing between the drive teeth 14 and the driven teeth 15 transfers torque from the driving ring 7 to the driven rings 4, 9. In the preferred embodiment, each of the driven teeth 15 are identically sized and shaped as each other, and identically sized and shaped as each of the drive teeth 14, contacting each other over a 10 mm long contact face. With eighteen pairs of meshing teeth, 14, 15 each tooth extends circumferentially over less than 10°, and more preferably about 8°. Alternatively, the driven teeth 15 could be larger circumferentially than the drive teeth 14, or vice-versa. A left spring 3 biases the left driven ring 4 toward the driving ring 7. A right spring 10 biases the right driven ring 9 toward the driving ring 7. As will be explained, the spring force is selected to provide the desired inward acceleration, thereby affecting the timing on when the differential relocks.

Figure 17:
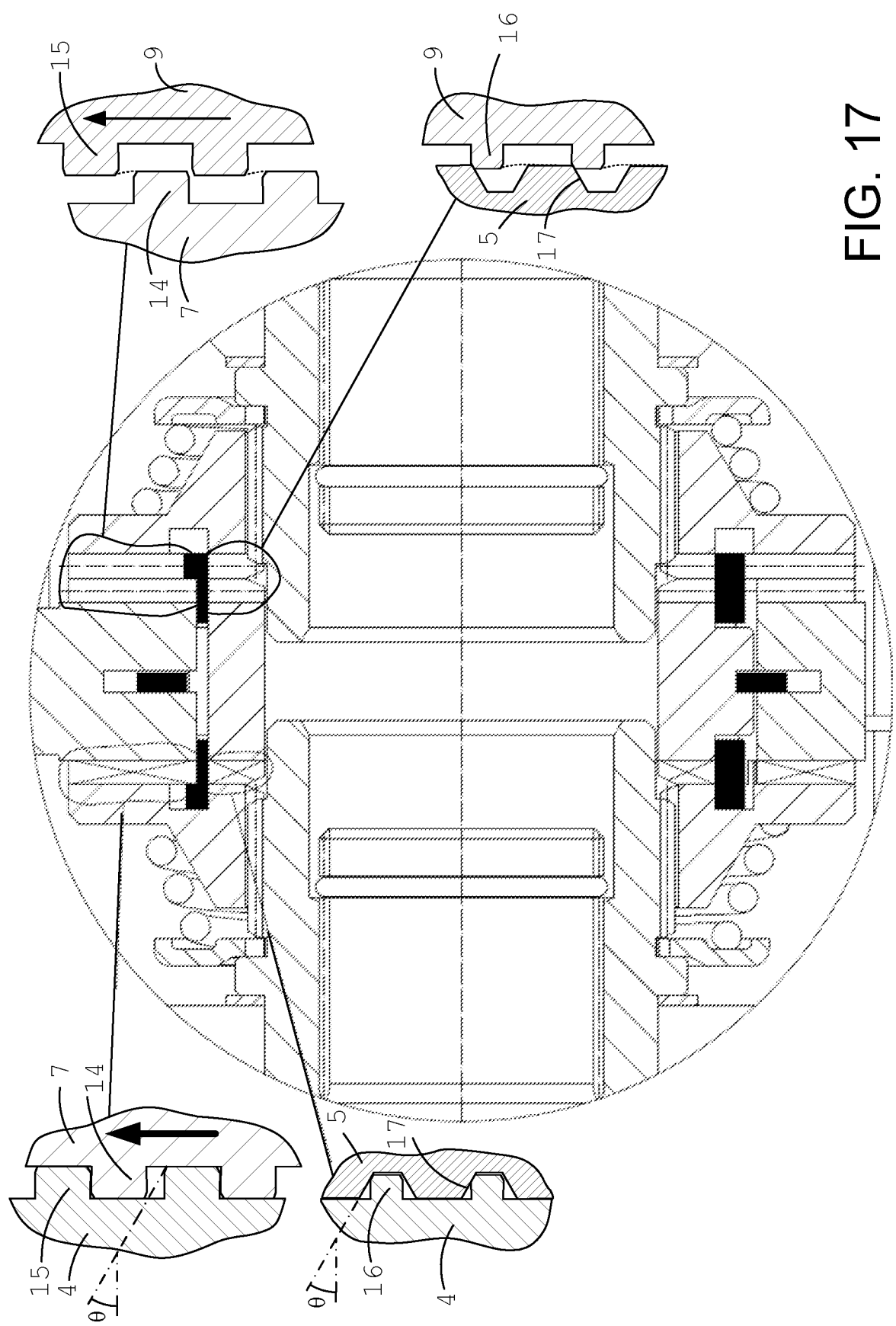
FIG. 17 is an enlargement similar to FIG. 3, but with the right side fully disengaged, and further schematically showing the relative tooth engagement of the two sides, with the four tooth engagement schematics in cross section looking radially inward.

As best shown in FIGS. 7, 15 and 17, the respective driven teeth 15 each have a shape which while engaged maintains contact with the drive teeth 14 of the driving ring 7. If desired, this could be done via drive teeth and driven teeth which contact each other with a 90° pressure angle, so each spring 3, 10 by itself keeps its respective driven ring 4, 9 in the normal, locked inside position whenever torque is being transmitted from the driving ring 7 to the driven ring 4, 9. More preferably, the shape of the driven teeth 15 and drive teeth 14 biases the driven ring 4, 9 toward the driving ring 7 whenever the drive teeth 14 are transferring torque to the driven teeth 15, adding to the biasing force of the spring 3, 10. In the preferred embodiment, each of the driven teeth 15 are substantially shaped as inverted trapezoids, wider at their ends than where the teeth join to the driven ring 4, 9. Similarly, each of the drive teeth 14 are substantially shaped as inverted trapezoids, wider at their ends than where the teeth join to the drive ring 7, providing a reverse pressure angle. The pressure angle need only provide a slight amount of force biasing the driven rings 4, 9 toward the drive ring 7. In the preferred embodiment, the pressure angle α is −1°, i.e., the engaging face of each tooth is at an 89° angle β to the face plane. The corners of the inverted trapezoidal shape should be chamfered or otherwise angled, such as at 30° chamfers γ.

A significant clearance is kept between the drive teeth 14 of the drive ring 7 and driven teeth 15 of each of the driven rings 4, 9, so the respective teeth only contact on the side that is transferring torque. For best operation, the clearances should collectively provide 10 to 50% circumferentially of the drive ring 7 and the left and right driven rings 4, 9. For instance, with eighteen pairs of meshing teeth, providing teeth which extend 8° in the circumferential direction allows a clearance of 4° per tooth, i.e., the clearances make up 20% circumferentially of the drive ring 7 and the left and right driven rings 4, 9. As will be explained, the required length of clearance interplays with the angle θ of the ramps 17 for unlocking and locking, such that FIG. 17 shows the angle θ as applied to the clearance.

In the preferred embodiment, each of the leading faces of the driven teeth 15 are shaped identically to each of the trailing faces of the driven teeth 15, and each of the leading faces of the drive teeth 14 are shaped identically to each of the trailing faces of the drive teeth 14. By having identically shaped leading and trailing faces, the differential operates identically in forward as in reverse. Alternatively, different pressure angles could be used for the leading faces as compared to the trailing faces, so the engagement and disengagement occurs at different relative amounts of wheel rotation in forward than in reverse.

The preferred unlocking mechanism for the differential is provided by the interaction between an inner ring of cam teeth 16 on the driven rings 4, 9 and ramps 17 on the central ramping separator ring 5. In contrast to the clearance between the drive teeth 14 and the driven teeth 15 and as best seen in FIG. 17, substantially no clearance exists between ramps 17 on the central ramping separator ring 5 and the cam teeth 16 of each of the driven rings 4, 9. The ramps 17 are spaced circumferentially to match the drive teeth 14, i.e., eighteen ramps 17 for eighteen teeth 14. The ramps 17 are sized circumferentially so they fit within the clearance between the drive teeth 14 and the driven teeth 15. In the preferred embodiment and for ease of machining, the ramps 17 are linear at a ramp angle θ of 30°. Also for ease of machining, the cam teeth 16 may be shaped substantially in the inverted trapezoidal shape.

Operation of the mechanical locking differential of the present invention is best understood with reference to FIGS. 16 and 17. When the vehicle travels in a straight line, there is no speed difference between the wheels at the two sides of the vehicle. The drive ring 7, through main transmission meshing pairs formed between teeth of the drive ring 7 and the teeth of each of the driven rings 4, 9, transmits torque/power to both the left driven ring 4 and the right driven ring 9. The left driven ring 4, by virtue of its inner diameter splines interacting with the left spline sleeve 1, transmits torque/power to the left half-axle 101. The right driven ring 9 likewise transmits torque/power to the right half-axle 102. The drive ring 7 and each of the driven rings 4, 9 are locked by the inverted trapezoidal teeth 14, 15 together with the biasing force of the springs 3, 10 is reliable, and allows the driving force to be distributed to the left side and the right side as required. While travelling in a straight line with each wheel being equally driven, the meshing pairs between the ramps 17 of the central ramping separator ring 5 and the cam teeth 16 of the driven rings 4, 9 are in a state of substantial non-contact, or at a minimum not transferring torque.

When the vehicle turns a corner, the outside wheel has a greater travel distance, and therefore tends to rotate faster under the effect of friction from the ground. FIGS. 16 and 17 represent the vehicle making a left turn, in which the right wheel rotates faster than the left wheel, to the point that no torque is being transmitted from the drive shaft to the right wheel and all the torque on the right wheel is due to its frictional engagement with the ground. As soon as the right wheel rotational speed exceeds the drive ring rotational speed (as shown by arrows in FIG. 16), the drive teeth 14 and the driven teeth 15 lose contact, and instead the cam teeth 16 make contact with and begin to ride up the ramps 17 as shown in FIG. 16B. With the inverted trapezoidal teeth no longer in contact, the interaction between the driven teeth 15 and the drive teeth 14 no longer hold the right driven ring 9 to the left. When the incline force of the cam teeth/ramps exceeds the force of the spring 10, the right driven ring 9 moves fully to the disengaged position shown in FIGS. 16C and 17. The ramp angle must be sufficient relative to the clearance between the drive teeth 14 and the driven teeth 15 that the right driven ring 9 can fully disengage to the right without interference between the paths of the drive teeth 14 and the driven teeth 15. Now the right wheel is fully unlocked from the differential and can rotate faster than the drive ring 9. With the right wheel unlocked, tire slipping and scuffing are avoided. The left wheel, rotating more slowly, receives all of the driving torque of the engine.

The biasing force of the spring 3, 10 is selected based on the desired relocking of the differential. Each time the driven tooth 15 passes over the gaps between the driving teeth 14, the spring 3, 10 begins to accelerate the right driven ring 9 back toward engagement with the drive ring 7. However, as long as the right driven ring 9 continues to rotate substantially faster than the drive ring 7, the ramps 17 will each time continue to push the right driven ring 9 to the right against the spring force leftward acceleration and maintain the right driven ring 9 in the disengaged position. Once disengaged, the right wheel can thus rotate freely at its higher speed until it slows back down to the speed of the drive ring 7. When the drive ring 7 and the right driven ring 9 are rotating at substantially the same speed, the driven teeth 15 align between the drive teeth 14, and the spring 3, 10 has enough time to push the right driven ring 9 back into full engagement with the driven teeth 15 between the drive teeth 14 and with the inverted trapezoidal shaped pressure angle contributing to maintain a locked condition of both wheels.

It is possible, of course, that the unlocked wheel may slow too quickly to permit relocking, particularly if the driver is quickly making alternative direction turns in a slalom fashion. The vehicle then merely continues, supplying all the engine torque to the faster-moving wheel, until straightening of the vehicle, friction or slowing of the vehicle permits sufficient time with both wheels rotating at substantially the same speed for reengagement.

When the vehicle encounters a complex road condition and a wheel at one side is suspended in the air, the wheel on the ground always maintains the driving force to propel the vehicle forward. Since the airborne wheel has no ground friction external force tending to rotate it faster than the wheel on the ground, the airborne wheel merely continues to rotate at the same speed as the wheel on the ground. But because the wheel on the ground remains fully locked relative to the drive shaft, the vehicle can propel through many stuck conditions, and the working reliability of the all-terrain vehicle is greatly improved.

As another embodiment, the ramps of the central ramping separator ring 5 need not have a linear contact face shape, but instead can have a curve or a sinusoidal profile. Such a curve or sinusoidal profile helps to reduce wear that occurs between the ramps 17 and the cam teeth 16 whenever one wheel is spinning faster than the drive ring 7. The ramps 17 and/or the cam teeth 16 can also have a height which is greater than the height of the driving teeth 14 and the driven teeth 15, to ensure that the driven teeth 15 do not contact the driving teeth 14 whenever the wheel is rotating significantly faster than the driving ring 7.

The present invention thus provides a low cost and effective solution to the locking differential problem. The preferred embodiment changes from a locked condition to an unlocked condition with a minimum of moving parts and minimum complexity, relying instead on the frictional spinning of a wheel by the ground as the vehicle is moving.

Although the present invention has been described with reference to preferred embodiments, workers skilled in the art will recognize that changes may be made in form and detail without departing from the spirit and scope of the invention.

The invention claimed is:

1. A mechanical locking differential comprising:
   a drive ring having a plurality of drive teeth on each of two sides, the drive ring being rotationally driven about its axis;
   a left driven ring having a plurality of driven teeth mating with the plurality of drive teeth on a left side of the drive ring, the left driven ring being movable to the left out of engagement with the drive ring and to the right into engagement with the drive ring, the driven teeth having a pressure angle with respect to the drive teeth which places a rightward force on the left driven ring, the driven teeth of the left driven ring having a circumferential clearance relative to the mating drive teeth;
   a left half axle coupled for rotation with the left driven ring;
   a ramping mechanism that biases the left driven ring to the left out of engagement with the drive ring when the left half axle rotates faster than the drive ring, wherein ramping action occurs within the clearance of the driven teeth of the left driven ring relative to the drive teeth;
   a right driven ring having a plurality of driven teeth mating with the plurality of drive teeth on a right side of the drive ring, the right driven ring being movable to the right out of engagement with the drive ring and to the left into engagement with the drive ring, the driven teeth having a pressure angle with respect to the drive teeth which places a leftward force on the right driven ring, the driven teeth of the right driven ring having a circumferential clearance relative to the mating drive teeth;
   a right half axle coupled for rotation with the right driven ring; and
   a ramping mechanism that biases the right driven ring to the right out of engagement with the drive ring when the right half axle rotates faster than the drive ring, wherein ramping action occurs within the clearance of the driven teeth of the right driven ring relative to the drive teeth.

2. The mechanical locking differential of claim 1, further comprising:
   a left spring biasing the left driven ring to the right, adding to the rightward force created by the pressure angle between the driven teeth of the left driven ring and the drive teeth of the drive ring; and
   a right spring biasing the right driven ring to the left, adding to the leftward force created by the pressure angle between the driven teeth of the left driven ring and the drive teeth of the drive ring.

3. The mechanical locking differential of claim 1, wherein the driven teeth and the drive teeth, when viewed in a cross-section showing left and right directions parallel to the axis of rotation, have an inverted trapezoidal shape, such that the driven teeth are wider at their ends than where the driven teeth join to the driven ring, and such that the drive teeth are wider at their ends than where the drive teeth join to the drive ring.

4. The mechanical locking differential of claim 3, wherein the driven teeth and the drive teeth define a pressure angle of −1°.

5. The mechanical locking differential of claim 4, wherein the driven teeth and the drive teeth have a 30° chamfer at corners of the inverted trapezoidal shape.

6. The mechanical locking differential of claim 1, wherein the clearances collectively provide 10 to 50% circumferentially of the drive ring and the right and left driven rings.

7. The mechanical locking differential of claim 6, wherein each tooth extends 8° circumferentially, and wherein each clearance extends 4° circumferentially.

8. The mechanical locking differential of claim 1, wherein the ramping mechanisms comprise
   a central ramping separator ring with one ramp corresponding with each tooth on the drive ring; and
   cam teeth on the left and right driven rings which ride on the ramps when the associated left and right half axle rotates faster than the drive ring, thereby pushing the driven ring away from engagement with the drive ring.

9. The mechanical locking differential of claim 8, wherein the ramps have a ramp face extending at 60° relative to a face of the central ramping separator ring perpendicular to its axis of rotation.

10. The mechanical locking differential of claim 9, wherein the cam teeth, when viewed in a cross-section showing left and right directions parallel to the axis of rotation, have an inverted trapezoidal shape, such that the cam teeth are wider at their ends than where the cam teeth join to the driven ring, with a 30° chamfer at corners of the inverted trapezoidal shape.

11. The mechanical locking differential of claim 8, wherein the central ramping separator ring can rotate relative to the drive ring.

12. The mechanical locking differential of claim 1, further comprising:
   a left differential shell and a right differential shell bolted to the drive ring.

13. The mechanical locking differential of claim 12, further comprising:
   driving bevel gear ring coupled to the left differential shell and the right differential shell for rotation of the drive ring, the left differential shell and the right differential shell based on rotation of a drive shaft with a bevel gear.

14. A mechanical locking differential comprising:
   a drive ring having a plurality of drive teeth, the drive ring being rotationally driven about its axis, the drive teeth, when viewed in a cross-section showing left and right directions parallel to the axis of rotation, having an inverted trapezoidal shape such that the drive teeth are wider at their ends than where the drive teeth join to the drive ring;
   a driven ring having a plurality of driven teeth mating with the plurality of drive teeth on a side of the drive ring, the driven ring being movable from side to side into and out of engagement with the drive ring, the driven teeth, when viewed in a cross-section showing left and right directions parallel to the axis of rotation, having an inverted trapezoidal shape, such that the driven teeth are wider at their ends than where the driven teeth join to the driven ring; and
   a mechanism that biases the driven ring out of engagement with the drive ring when the driven ring rotates faster than the drive ring, and into engagement with the drive ring when torque is delivered from the drive ring to the driven ring in a locked configuration.

15. The mechanical locking differential of claim 14, wherein the drive teeth and the driven teeth each provide a clearance.

16. The mechanical locking differential of claim 15, wherein the clearances collectively provide 10 to 50% circumferentially of the drive ring and the driven ring.

17. The mechanical locking differential of claim 16, wherein each tooth extends circumferentially at least twice as far as each clearance extends circumferentially.

18. The mechanical locking differential of claim 17, further comprising:
   a left differential shell and a right differential shell bolted to the drive ring.

\* \* \* \* \*